May 22, 1934.　　　　　C. D. SALDA　　　　　1,959,462
COMPENSATED ASYNCHRONOUS MOTOR
Filed March 2, 1932　　　3 Sheets-Sheet 1
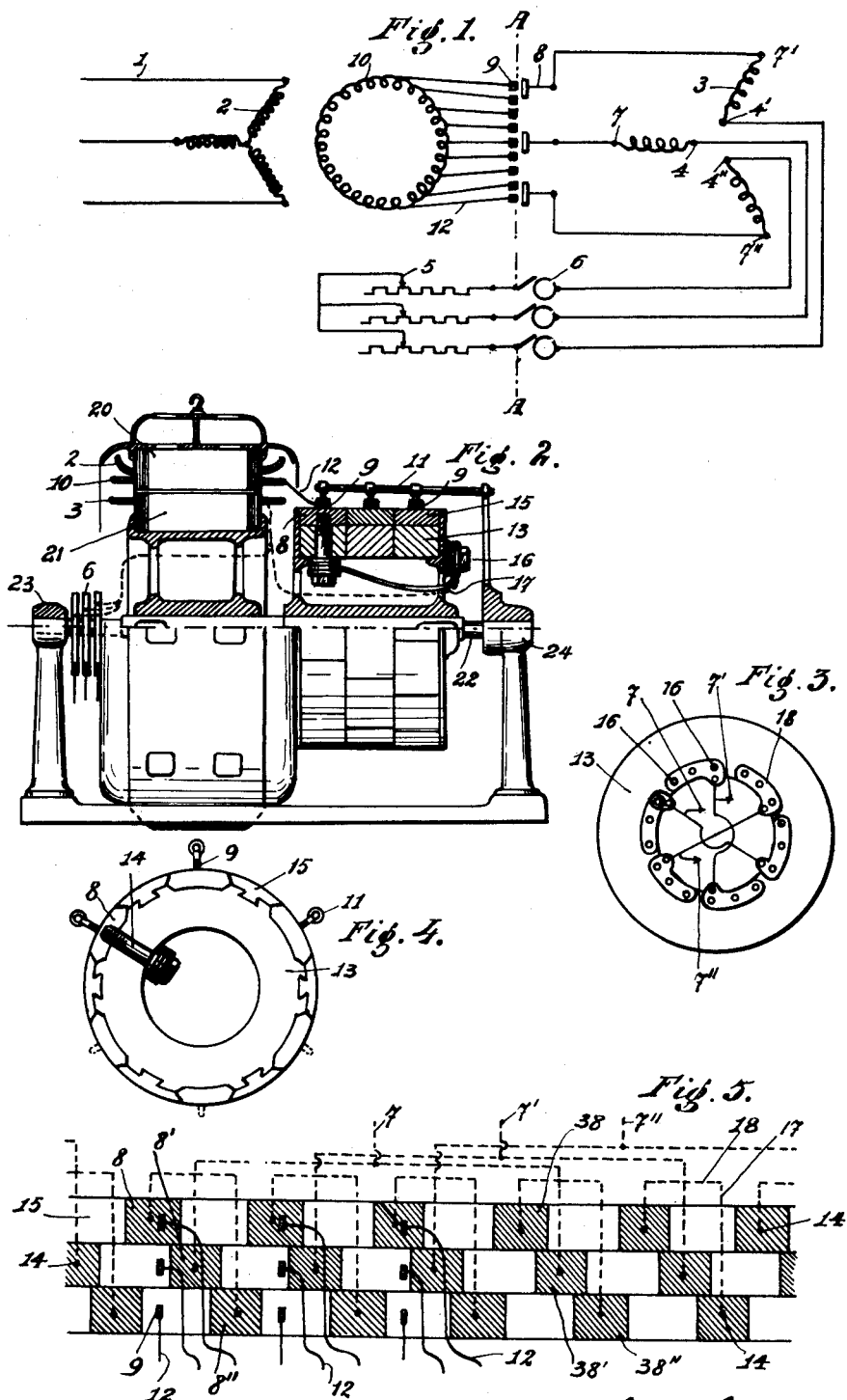

May 22, 1934. C. D. SALDA 1,959,462
COMPENSATED ASYNCHRONOUS MOTOR
Filed March 2, 1932 3 Sheets-Sheet 2

Inventor:
Cesare Della Salda

Patented May 22, 1934

1,959,462

UNITED STATES PATENT OFFICE 1,959,462

COMPENSATED ASYNCHRONOUS MOTOR

Cesare Della Salda, Bibbiano, Italy

Application March 2, 1932, Serial No. 596,311
In Germany March 24, 1931

11 Claims. (Cl. 172—274)

Compensated asynchronous motors have the object of reducing, cancelling or even reversing the lag between the current taken in from the mains by ordinary induction machines and the corresponding impressed voltage, what is obtained, for instance, by providing the motor with an appropriate compensating winding of the continuous current kind with collector, said winding being arranged in the same slots in which the primary winding of the motor is lodged and being "cascade" connected with the secondary through fixed brushes sliding in contact with a rotating collector. Motors of this kind have an inverted arrangement of their fundamental elements, as compared with motors of the conventional types, i. e., the stator carries the secondary winding and the rotor the primary and the compensating windings. Such an arrangement is required in order that the electromotive forces induced by the rotating field in the secondary winding and between the fixed brushes of the compensating winding, may have the same frequence, and also in order that the phase of the latter relatively to the former may be adjustable at will.

However, a disadvantage results from this in that the primary windings have to be fed by means of revolving collector rings and their brushes which have to remain in constant operation and can cause sparks, flashovers and short circuits.

For the above reasons the use of these compensated motors is limited to small powers and to low voltages.

The object of the present invention is the provision of an asynchronous compensated motor suitable also for heavy duty and for high voltages and which is free from the above mentioned defects.

Current is fed to the motor of the present invention at the winding of the stator which also carries a compensating winding. The latter winding is "cascade" connected to the secondary through an inverted collector in which the segments are in the place of the brushes and the brushes are in the place of the segments. These segments have the shape of fixed and adjustable brushes, arranged in a number of parallel rows and the segments slide over a cylindrical body carrying contacts uniformly distributed and electrically connected, said body being adjustably keyed to the shaft of the motor.

It may be useful to remember here, that in the following specification the name of "brushes", will always be given to the fixed contact members, while the name of segments will be given to the rotating contact members and the name of "segment-groups" to each group of segments, connected to each other by conducting leads, notwithstanding the fact that in the new motor the brushes and the segment-groups electrically correspond respectively to the segments and to the rows of brushes of the collector machines usually employed.

Broadly considered, the asynchronous motor referred to in the present invention, is characterized by the feature that the primary and the compensating windings are both arranged in the stator's slots, while the secondary winding is placed in the rotor's slots and the electrical connection between compensating and secondary windings is obtained through two suitable systems of contacts.

According to another feature of the invention, the system of fixed contacts is formed by a number $N$ of brushes connected to the $N$ winding sections of the compensator and said brushes are grouped in a number of parallel rows, equal to the product $f.p$ of the number of phases $f$ of the secondary in the number $p$ of pairs of poles of said secondary.

When a number $N$ is a multiple of $f.p$, the number $$\frac{N}{f.p}$$

of fixed brushes per row results equal for all rows and these are spaced equally.

When $N$ is not divisible by $f.p$, the number of brushes per row becomes different from one row to another, and for some rows is equal to the whole number $$\frac{N+x}{f.p}$$

immediately greater than $$\frac{N}{f.p}$$

and for other rows it is equal to the whole number immediately below, $$\frac{N+x}{f.p}-1.$$

Besides, the spacings from one row and another appear, in this latter case, of different value, said difference corresponding to the spacing between two contiguous slots containing the compensating winding.

The system of rotating contacts, shows a number of segments equal to the number of fixed brushes, namely N, when N is a multiple of $f.p$. When instead $$\frac{N}{f.p}$$

is a fractionary number, the total number of segments is greater than N and is equal to $N+x$. In either case the rotating segments form a number of series of segments respectively equal to $$\frac{N}{f.p} \text{ or } \frac{N+x}{f.p}$$

and the series are placed one beside the other with a relative angular displacement of $$\frac{360°}{N}$$

and each series will be formed of $f.p$ segments. The rotating segments are then distributed in groups the number of which is equal to the product $f.p$ and the units of each group are connected together by conducting leads.

Said groups are then connected with the terminals of the secondary winding.

The number of fixed brushes may be reduced, and namely, according to another characteristic feature of the invention, the number of rows of brushes can be reduced down to the number of rows corresponding to two neighbouring poles, while the other rows, whose number is equal to $$f.p. \frac{p-1}{p},$$

is omitted

In the attached drawings are shown as a matter of example, four embodiments of the invention with reference to a four pole, three phase compensated motor, having compensating winding of the series and parallel types, and an embodiment involving a two pole three phase compensated motor.

In said drawings:

Fig. 1 shows a main diagram of the motor circuits;

Fig. 2 is a diagrammatic view of a motor according to the invention, with its upper half in section;

Fig. 3 is a side view of the motor as in Fig. 2 seen on the collector's side,

Fig. 4 shows a diagrammatic section of the rotating contact device,

Fig. 5 is said contact device spread out and shows diagrammatically its electric circuits in the case of a motor with rows of brushes partly eliminated.

Figure 7:
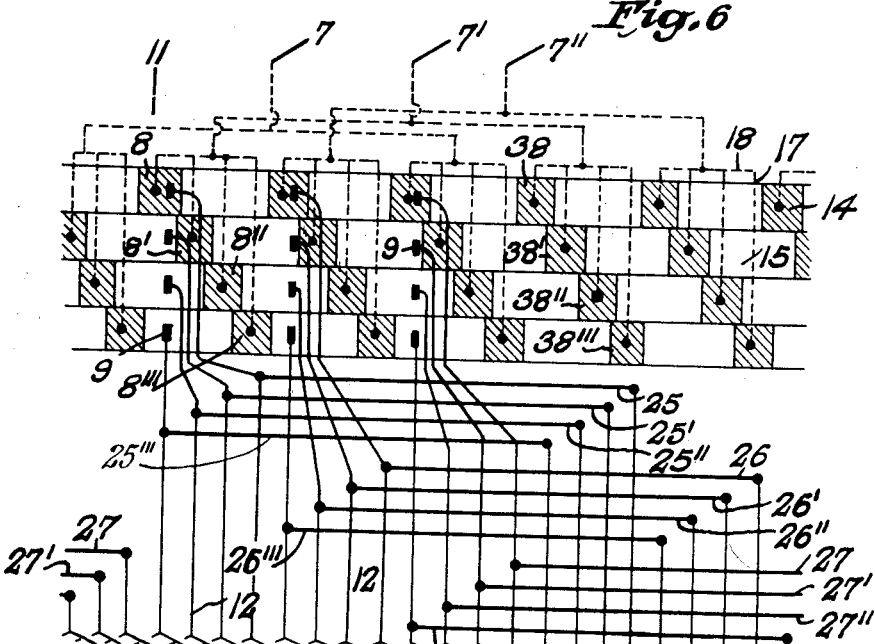

Fig. 7 relates to a three phase, four pole motor provided with a compensating winding of the parallel type, provided with equipotential connections and with equal rows of brushes the latter being partly eliminated.

Figure 8:
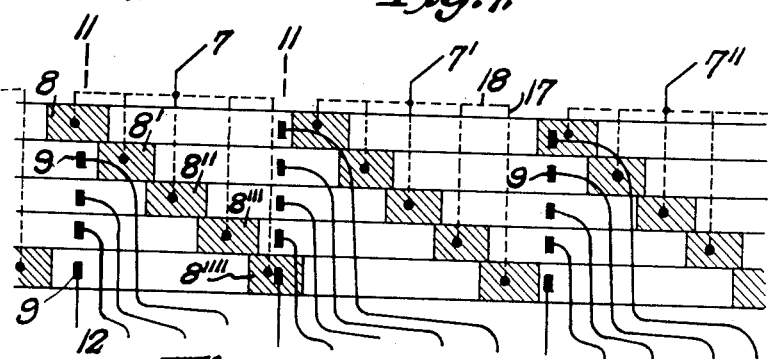

Fig. 8 relates to a three phase two pole compensated motor having unequal rows of brushes.

Figure 9:
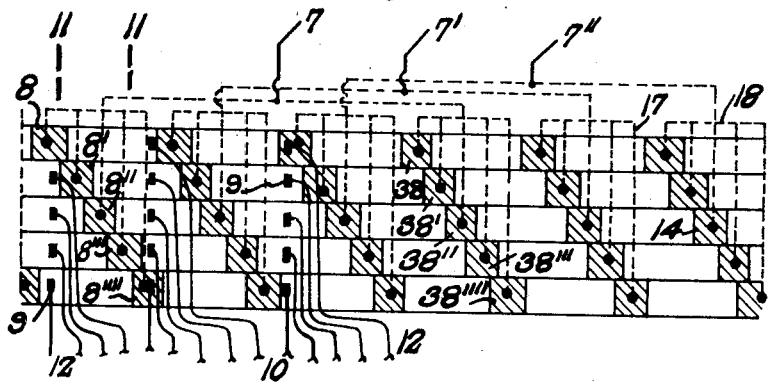

Fig. 9 represents a three phase, four pole motor provided with a series compensating winding and with unequal rows of brushes which are partly suppressed.

Figure 10:
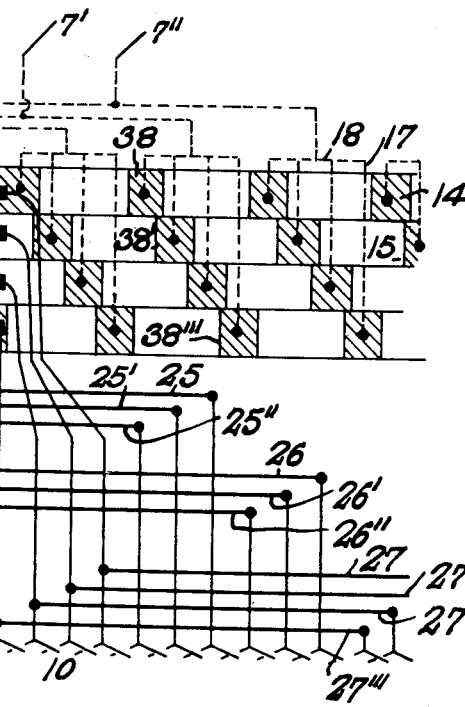

Fig. 10 differs from Fig. 9 in that the shunt compensating winding is provided with equipotential connections.

Figs. 2, 3, 4, 5 and 9 relate to the case of a three phase four pole motor having a series compensating winding.

In Fig. 1 is shown the electric circuits of the motor. The three phase main, feeds directly the star-connected primary winding 2 on the stator. The secondary winding 3, also star-connected, is arranged on the rotor and the terminals 4, 4', 4'' of the coils are connected to the starting resistance through three collector rings. The free terminals 7, 7', 7'' of the secondary winding, are connected to three segments 8 which slide on the system of brushes connected to the compensating winding 10.

In Fig. 1, on the left of the dividing line AA, are shown the fixed parts and on the right the moving members of the machine.

Figure 6:
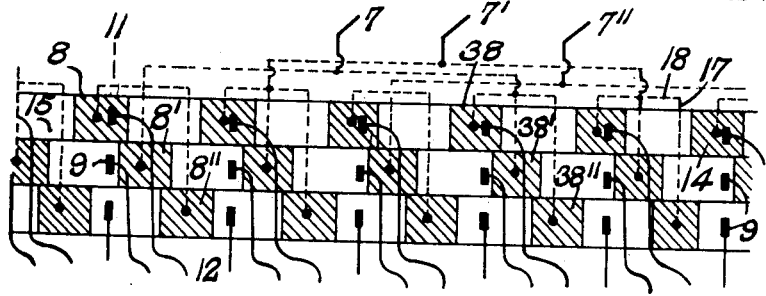
Fig. 6 is a showing similar to Fig. 5 for the case where the rows of brushes are complete in number but which can be applied to the two types of windings.

The number of brushes 9 is equal to the number of sections in which the compensating winding 10 is subdivided. The number of the sections of the fixed winding 10 is generally very great and if the contact device had to be accomplished according to the practice heretofore followed there would be serious difficulties to obtain it due to the very high number of brushes required. As stated above, there should be provided as many brushes 9 as there are sections in the compensating winding 10, therefore the free space between adjoining brushes would be very small. In order to overcome this difficulty, the brushes, according to a special feature of the invention, are expressly arranged in parallel rows 11 (Figs. 5 and 6).

The motor comprises, as usual, two parts: the stator 20 with laminated core and the rotor 21 keyed to shaft 22 supported on bearings 23 and 24. In the stator's slots are arranged the coils 2 of the primary winding, and the sections of the compensating winding.

The rotor's slots contain the coils of the secondary winding. The example illustrated in Figs. 2, 3, 4, 5, 6, 7, 9 and 10 refers to a four pole three-phase motor with both primary and secondary star-connected. The three terminals of the secondary are connected to rings 6 and to the starting resistance. The three opposite terminals are connected to the system of terminals 16 carried by the cylindrical body 13.

The points of connection of the sections of the compensating winding are fixed by means of small forks 12 to the brushes 9, arranged in parallel rows 11.

In the motor illustrated in Figs. 2, 3, 4, 5, 6, 7, 9 and 10, having a four pole three phase rotor the number of sections of the compensating winding is 18. If the number of phases $f=3$ and the pairs of poles $p=2$ the number of brushes in each row will be equal to $$\frac{18}{2\times 3}=3$$

and the rows will be mutually apart the same distance and will be equal in number to $3\times 2=6$.

The rotating segments 8 are distributed over the cylindrical body 13 to which they are secured by means of screws 14 (see also Fig. 4) and are separated one from another by means of insulating blocks 15 whose spacing function is merely a mechanical one.

Due to the arrangement adopted of the fixed brushes in parallel rows, the rotating segments have to be distributed on different neighbouring circular series, in order that the commutation may take place in the standard manner proper of usual collector machines. And whereas the brushes prearranged on a row have effectively undergone a progressive reciprocal angular shift of $$\frac{360°}{N}$$

also the segments, (for instance 8, 8′, 8″ in Figs. 5 and 6) forming a segment-group, have to be mutually and angularly displaced by $$\frac{360°}{N}$$

in the same direction. Thus the arrangement of Figs. 5 and 6 is obtained, representing the development in a plane of the cylindrical body 13. Every segment-group consists in $n$ segments (for instance 8, 8′, 8″ in Figs. 5 and 6 where $n=3$) which are shifted angularly one relatively to the other. In the example illustrated in Figs. 2–6, the fixed brushes being arranged on 6 rows of 3 brushes each, the segments are correspondingly arranged on 3 circular series and the number of segment-groups will be $f.p=3.2=6$. Thus the number of segments forming the cylindrical body (8, 8′, 8″ etc.) is 18 in total, which appear distributed side by side on three rings. The free terminals of the secondary are connected to the segments of the cylinder as shown in Fig. 3 and in Fig. 5. On the outer side of the cylindrical body 13, or else on an appropriate separate ring, are arranged, in proper order, the terminals 16 and these correspond to the various segments of the cylindrical body with which they communicate through connections 17. The terminals corresponding to segments of equal potential are connected to each other by means of plates 18, thus achieving the single segment-groups. The free terminals of the secondary 7, 7′, 7″ are connected to the resulting terminals of the segment-groups.

Let us now consider the case in which, contrary-wise to the preceding example, the number $$\frac{N}{f.p}$$

be a fraction.

Let us suppose $N=14$, $f=3$, $p=1$: consequently:

$$\frac{N}{f.p}=\frac{14}{3.1}=4{,}666.$$

In such a case the number of rows of fixed brushes is $f.p=3$ and every row consists respectively of 4, 5, 5, brushes. The mutual angular distance between the three rows will be respectively equal to 4 or 5 times the distance $$\frac{360}{14}$$

and thus will be $$\frac{360}{14}\times 4 \rightleftharpoons 103°$$

(electrical degrees) and $$\frac{360}{14}\times 5 \rightleftharpoons 128°\ 40'$$

(electrical degrees), as shown in Fig. 8. On the contrary, this distance will be uniform and equal to 120° (electrical degrees) if the number of winding sections is a multiple of $f.p$, (number of phases multiplied by the number of pairs of poles); this case is proven (tried out) in the embodiment shown in Figs. 5, 6 and 7.

The number of rotating segments per group will be $$\frac{N+x}{f.p}=\frac{14+1}{3.1}=5$$

and the 15 segments will form three segment-groups, shifted by 120° relatively to each other.

According to another feature of this invention, the number of rows of brushes 11 can be diminished viz. reduced to the rows corresponding to a single pair of neighbouring poles, by omitting the rows of brushes corresponding to $2p-2$ poles as shown in Figs. 5, 7, 9 and 10.

Let us consider at first the case in which the compensating winding is of the wave type or in series. The winding sections are distinguishable in two classes: one formed by $$\frac{N}{p},$$

the other by $$\frac{p-1}{p}N$$

sections. One only of the terminals of each of the $$\frac{N}{p}$$

contiguous winding sections is connected to a brush. Both the terminals of the remaining $$\frac{p-1}{p}N$$

sections are not connected to brushes.

At the instant a group of segments (for ex. 8, 8′, 8″ in Figs. 5 and 8) leaves the last brush, it remains without current and in the next winding section flows a current which, after having gone through $p-1$ sections, proceeds from another group of segments connected in electric parallel with the first (for instance 38, 38′ 38″ in Figs. 5 and 8). Every group of segments remains deprived of current during the time corresponding to a rotation of $$\frac{(p-1)\ 360°}{p}.$$

The current's direction in the compensating winding and the behaviour of said winding remain the same as with the motor having the full rows of brushes.

Let us consider a compensating winding of the overlapping or parallel type (Figs. 7 and 10). In this case also it is possible to reduce the number of rows of brushes to the number corresponding to two subsequent poles, provided the winding be connected with all the possible equipotential connections, to be made in the known way.

With this the behaviour of the compensating winding 10 remains the same as in the case of a complete row of brushes. In Fig. 7 the number of sections of the compensating winding is equal to 24, the equipotential connections are designated by the numerals 25, 25′, 25″, 25‴, 26, 26′, 26″, 26‴, 27, 27′, 27″, 27‴, the other reference numerals refer to the same elements as those in Figs. 5 and 6. In the case of Fig. 10 the number of sections in the compensating winding is equal to 20 and the rows of brushes are unequal.

From the aforesaid statements it may be foreseen that the motor according to the present invention will be particularly adapted for machines having a very high number of poles.

The compensation, that is the correction of the power factor (cos $\phi$) of the induction motor, can be adjusted, with whatsoever compensating winding 10, by properly keying, during the construction, the body 13 on the driving shaft. An equal result is obtained by altering the connection to the terminals 7, 7′, 7″ of the secondary winding to terminals 16, relatively to the stator.

This alteration can be achieved by shifting blocks 18 or by shifting pins 11 carrying the brushes 9.

In fact in one or in the other of the aforesaid ways, the phase of the electromotive force of the compensating winding is varied relatively to the electromotive force of the secondary.

A first correction of the motor's power factor may be achieved by using one of the above mentioned ways: a more correct compensation, which eventually may be made to depend on the load, will be obtained with a combination of the aforesaid ways. It is possible, for example, to achieve a first compensation by keying the body 13 to the rotor, while a second and more correct one can be obtained by shifting the pins 11.

Of course, in practice, constructive details may be varied at will, without exceeding the limits of the present invention. The embodiments described, as already stated, are merely examples. The invention can be used equally well also for single or polyphase motors for any kind of winding and of connections of the stator and rotor. Of course it can be used also for asynchronous condensers (condensing-reacting machines), these being essentially nothing else but compensated motors running idle.

What I claim is:

1. The combination in a motor of a stator including a primary and a compensating winding and a plurality of brushes, each brush connected to a section of said compensating winding, a rotor including a secondary winding and a collector, said brushes being arranged in rows parallel to the axis of said collector, the rows being circumferentially spaced with respect to said axis, said collector being formed of a plurality of segments, said segments being arranged in a plurality of axially spaced series, each series comprising a plurality of circumferentially spaced segments, the segments of the respective series being circumferentially offset to form oblique groups.

2. A motor as in claim 1, provided with a compensating winding of the wave type provided with series winding sections, characterized by the feature that the number of rows of brushes is limited to the number of rows corresponding to two subsequent poles.

3. A motor as in claim 1, provided with a compensating winding of the overlapping type provided with parallel winding sections, characterized by the feature that the number of rows of brushes is limited to the number of rows corresponding to two subsequent poles while in the same are arranged all the equipotential connections between the individual sections of said winding.

4. A motor as in claim 1, characterized by the feature that the segments of the collector are connected, by means of connecting members, in groups of equal potential and are connected with the free terminals of the secondary winding.

5. A motor as in claim 1, comprising a number of brushes equal to the number of sections of the compensating winding to which they are connected, these brushes being also subdivided into a number of straight rows triple the number of pairs of poles of the machine, the brushes in each row being disposed in such a way as to form with the corresponding brushes of the other rows, circular series arranged about the collector, the different rows of brushes being regularly spaced about said collector; the number of series of segments on the collector corresponding to the number of brushes in each row, and the number of segments in each series being triple the number of pairs of poles of the motor and the segments in a series being arranged so as to form with the contacts of consecutive series helicoidal groups, all the contacts of which are short-circuited among themselves and their circuits connected with the free end of the corresponding phase in the secondary.

6. A motor as in claim 1 comprising a number of brushes equal to the number of sections of the compensating winding corresponding to a single pair of poles of the machine and to which they are connected, the compensating winding being of the wave winding type comprising a number of sections connected in series, said brushes being also distributed into three straight rows spaced at regular intervals and parallel to the axis of the collector, the brushes in each row being placed so as to form with the brushes in the other rows circular series about the collector; the collector segments being arranged in a number of circular series corresponding to the number of brushes forming each row, each series of segments comprising a number of segments triple the number of pairs of poles of the motor and disposed so as to form with the segments of consecutive series helicoidal-shaped groups, all the contacts of which are short-circuited among themselves and their circuits connected with a free end of the corresponding phase in the secondary.

7. A motor as in claim 1 comprising a number of brushes equal to the number of sections in the compensating winding corresponding to a single pair of poles of the machine and to which they are connected, the compensating winding being of the type having its sections wound in parallel by lap winding, and provided with permanent connections placed on the stator, which connect the sections belonging to different pairs of poles and having the same phase and the same potential, the said brushes being disposed along three straight rows which are regularly spaced and are parallel to the axis of the collector, the brushes in each row being placed so as to form with the brushes of the other rows circular series about the collector; the number of series of collector segments corresponding to the number of brushes in each row, each series of segments comprising a number of segments triple the number of pairs of poles of the motor and arranged so as to form with the contacts of corresponding segment series helicoidal-shaped groups whose contacts are short-circuited among themselves and whose circuits are connected to a free end of the corresponding phase in the secondary.

8. A motor as in claim 1, comprising a number of brushes equal to the number of sections of the compensating winding to which they are connected, these brushes being subdivided into a number of straight rows triple the number of pairs of poles of the machine and arranged parallel to the axis of the collector, whereby a number of these rows comprise a certain number of brushes and other rows have a larger number, all arranged so as to form with the brushes of the other rows circular series about the collector, the various rows of brushes being spaced about said collector so that the angular interval between any row and the adjacent consecutive row, in the direction of the relative displacement imparted to the brushes with reference to the winding sections to which they are connected, is equal to as many times the angular distance between two sections of the compensating winding, as there are brushes in said consecutive line; the number of collector segments in a series corresponding to the number of brushes forming the longest row, each series of segments comprising a number of segments triple the number of pairs of poles of the motor and arranged so as to form with the contacts in the consecutive segment series, helicoidal groups, whose contacts are all short-circuited among themselves and whose circuits are connected to a free end of the corresponding phase of the secondary.

9. A motor as in claim 1, comprising a number of brushes equal to the number of sections of the compensating winding which corresponds to a single pair of poles of the machine and to which they are connected, the compensating winding being of the type in which the sections are connected in series, the said brushes being distributed in three straight rows which are arranged parallel to the axis of the collector in such a way that one of these rows includes a certain number of brushes and other rows a larger number, but arranged so as to form with the brushes of the other rows circular rows about the collector, the three rows of brushes being spaced about said collector so that the angular interval between one row and the adjacent consecutive row, following the direction of relative displacement given to the brushes with reference to the winding sections to which they are joined, is equal to as many times the angular distance between two sections of the compensating winding as there are brushes in the said consecutive rows, the number of collector segments corresponding to the number of brushes triple the number of pairs of poles of the motor and disposed so as to form with the segments of consecutive segment series helicoidal groups, whose segments are all short circuited among themselves and whose circuits are joined to a free end of the corresponding phase in the secondary.

10. A motor as in claim 1 comprising brushes equal in number to the number of sections in the compensating winding corresponding to a single pair of poles of the machine and to which they are connected, the compensating winding being of the type in which the sections are wound in parallel and are provided with permanent connections disposed on the stator and joining the sections which belong to the different pairs of poles and having the same phase and the same potential, the said brushes being distributed in three rows which are parallel to the axis of the collector, so that some of the rows comprise a certain number of brushes and other rows a larger number, but all arranged in such a way as to form with the brushes in the other rows circular rows about the collector, the three rows of brushes being spaced about said collector in such a way that the angular interval between one row and the adjacent consecutive row following the direction of relative displacement give to the brushes with reference to the sections to which they are connected, is equal to as many times the angular distance between two sections of the compensating winding as there are brushes in said consecutive row, the number of series of collector segments corresponding to the number of brushes in the longest line of said rows, each series comprising a number of segments triple the number of pairs of poles, arranged so as to form with the segments of the consecutive series helicoidal groups segments which are all short-circuited among themselves and whose circuits are connected with a free end of the corresponding phase of the secondary.

11. The combination in a motor of a stator including a primary and a compensating winding and a plurality of brushes at least equal in number to the number of phases, each brush connected to a section of said compensating winding, a rotor including a secondary winding and a collector, said brushes being arranged in rows parallel to the axis of said collector, the rows being circumferentially spaced with respect to said axis at angular intervals corresponding to the angular spacing between the phases of said compensating winding, said collector being formed of a plurality of segments, said segments being arranged in a plurality of axially spaced series corresponding in number to the number of brushes, each series comprising a plurality of circumferentially spaced segments, the segments of the respective series being circumferentially offset to form oblique groups, each series being provided with a number of contacts at least equal to the number of pairs of poles of the motor.

CESARE DELLA SALDA.